United States Patent
Hernández Alonso et al.

(10) Patent No.: US 10,626,510 B2
(45) Date of Patent: Apr. 21, 2020

(54) FILTER-PRESS PHOTOELECTROCHEMICAL WATER OXIDATION AND CO2 REDUCTION CELL

(71) Applicant: REPSOL, S.A., Madrid (ES)

(72) Inventors: María Dolores Hernández Alonso, Móstoles (ES); Germán Penelas Pérez, Móstoles (ES); Teresa Andreu, Sant Adrià De Besòs (ES); Erdem Irtem, Sant Adrià De Besòs (ES); Andrés Parra, Sant Adrià De Besòs (ES); Cristián Fábrega, Sant Adrià De Besós (ES); Juan Ramón Morante, Sant Adriá De Besós (ES)

(73) Assignees: REPSOL, S.A., Madrid (ES); ENAGAS SERVICES SOLUTIONS, S.L.U., Madrid (ES)

( * ) Notice: Subject to any disclaimer, the term of this patent is extended or adjusted under 35 U.S.C. 154(b) by 285 days.

(21) Appl. No.: 15/537,046

(22) PCT Filed: Dec. 18, 2015

(86) PCT No.: PCT/EP2015/080402
§ 371 (c)(1),
(2) Date: Jun. 16, 2017

(87) PCT Pub. No.: WO2016/097247
PCT Pub. Date: Jun. 23, 2016

(65) Prior Publication Data
US 2018/0023203 A1 Jan. 25, 2018

(30) Foreign Application Priority Data
Dec. 19, 2014 (EP) .................................... 14382541

(51) Int. Cl.
*C25B 9/20* (2006.01)
*C25B 1/08* (2006.01)
(Continued)

(52) U.S. Cl.
CPC ................. *C25B 9/20* (2013.01); *B01J 23/38* (2013.01); *B01J 23/70* (2013.01); *C01B 32/50* (2017.08);
(Continued)

(58) Field of Classification Search
CPC .... C25B 9/20; C25B 1/08; C25B 1/00; C25B 1/003; B01J 23/70; B01J 23/38; C01B 32/50; Y02P 20/135
(Continued)

(56) References Cited

U.S. PATENT DOCUMENTS 4,240,882 A * 12/1980 Ang .................. C25B 1/003
205/340
5,112,464 A * 5/1992 Tsou .................. C25B 15/08
204/230.2
(Continued)

FOREIGN PATENT DOCUMENTS

JP 2013-155430 A 8/2013

OTHER PUBLICATIONS

International Search Report and Written Opinion of the International Searching Authority in PCT/EP2015/080402, dated Mar. 21, 2016, 13 pages.
(Continued)

*Primary Examiner* — Nicholas A Smith
*Assistant Examiner* — Colleen M Raphael
(74) *Attorney, Agent, or Firm* — Squire Patton Boggs (US) LLP

(57) ABSTRACT

The present disclosure relates to methods and devices for use in photoelectrochemical reduction of $CO_2$. In particular,
(Continued)

it is disclosed a filter-press photoelectrochemical cell for producing a reduction product from $CO_2$ and a method for the photoelectrochemical reduction of $CO_2$.

15 Claims, 12 Drawing Sheets

(51) Int. Cl.
    *C25B 1/00*     (2006.01)
    *C01B 32/50*     (2017.01)
    *B01J 23/38*     (2006.01)
    *B01J 23/70*     (2006.01)

(52) U.S. Cl.
    CPC ............... *C25B 1/00* (2013.01); *C25B 1/003* (2013.01); *C25B 1/08* (2013.01); *Y02P 20/135* (2015.11)

(58) Field of Classification Search
    USPC .......................................... 205/340; 204/248
    See application file for complete search history.

(56) References Cited

U.S. PATENT DOCUMENTS

| | | | |
|---|---|---|---|
| 9,528,192 B1* | 12/2016 | Chen | C25B 1/003 |
| 2009/0061267 A1 | 3/2009 | Monzyk et al. | |
| 2010/0180889 A1 | 7/2010 | Monzyk et al. | |
| 2012/0138456 A1* | 6/2012 | Spurgeon | C25B 1/003 |
| | | | 204/252 |
| 2013/0277209 A1* | 10/2013 | Sato | C25B 1/003 |
| | | | 204/252 |
| 2014/0360883 A1* | 12/2014 | Deguchi | C25B 1/003 |
| | | | 205/340 |
| 2016/0032462 A1* | 2/2016 | Yamaguchi | C25B 1/003 |
| | | | 204/252 |

OTHER PUBLICATIONS

Del Castillo, A. et al., Continuous Electroreduction of $CO_2$ to Formate Using Sn Gas Diffusion Electrodes (2014) *AlChE Journal* 60(10)pp: 3557-3564.

* cited by examiner

FILTER-PRESS PHOTOELECTROCHEMICAL WATER OXIDATION AND CO2 REDUCTION CELL

The present disclosure relates to methods and devices for use in photoelectrochemical reduction of $CO_2$.

BACKGROUND ART

Electrochemical valorisation of carbon dioxide to carbon containing renewable fuels and materials has had special attention in the literature over the last years. Recent research efforts have been focussed on some studies with filter-press type cells.

A filter-press electrolytic cell is an electrolytic cell consisting of several units in series. The basic unit cell contains an electrode pair (anode and cathode), with controlled narrow interelectrode gap by using dielectric spacers, rubber gaskets (for liquid and gas tightening) and membrane separators (if needed). The assembly is compressed between metal (usually stainless steel) end plates using tie-rods. In addition, spacers can hold plastic turbulence promoters adjacent to electrodes (to enhance mass transport).

The configuration of the cell allows providing reliable data to aid the scale up to industrial production scale electrolysers, using similar materials, interelectrode gap and space velocities.

In an electrolytic cell, $CO_2$ is reduced on the cathode while the oxygen evolution reaction takes place on the anode. Some examples of half reactions of the cathode for electrochemical $CO_2$ reduction into products are shown below:

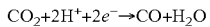
$CO_2 + 2H^+ + 2e^- \rightarrow CO + H_2O$

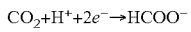
$CO_2 + H^+ + 2e^- \rightarrow HCOO^-$

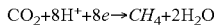
$CO_2 + 8H^+ + 8e^- \rightarrow CH_4 + 2H_2O$

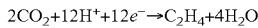
$2CO_2 + 12H^+ + 12e^- \rightarrow C_2H_4 + 4H_2O$

Formic acid is one of the relevant possible products in the electrolysis of aqueous solutions of $CO_2$, the main product of the reaction depending on the used electrocatalyst. Nevertheless, a problem in the utilization of $CO_2$ in aqueous solution derives from its low solubility in water at standard temperature and pressure. Higher pressures are necessary to increase the $CO_2$ concentration in the liquid phase, but electrode stability in these conditions is limited.

Solvents with high solubility for $CO_2$ are used in the nonaqueous electrochemical reduction of $CO_2$. However, high $CO_2$ solubility requires larger current density, but low electrolytic conductivity leads to high ohmic losses.

Another problem is that high current densities are necessary to increase the productivity and to maximize the formation of hydrocarbons, and also a fast deactivation is present in these conditions.

The use of porous electrodes such as gas diffusion electrodes (GDEs) on electrochemical reduction of $CO_2$ to formate using filter-press type cells have been object of recent studies. The GDEs allows operation at higher current densities and also permits direct feed of gaseous $CO_2$ to the cell.

Alvarez-Guerra M. et al., AlChE Journal, 2014, 60(10) pp. 3557-3564, describe the influence of key variables on the performance of an experimental system under dark conditions for continuous electroreduction of $CO_2$ to formate with a gas diffusion electrode (GDE) loaded with Sn as electrocatalyst.

There are still several technological challenges in $CO_2$ electrocatalytic reduction. The low catalyst activity of the catalysts employed makes the overpotential in $CO_2$ electroreduction too high, and as a consequence, energy efficiency is not good enough for industrial exploitation of the process. Furthermore, the catalysts used suffer from insufficient stability and durability.

This is because the catalysts become gradually covered by reaction intermediates and by-products blocking catalyst active sites. Finally, scaling-up these processes need of strong efforts on optimizing system designs and the electrodes/reactor.

SUMMARY

A first aspect, the present disclosure relates to a filter-press photoelectrochemical cell comprising:

a) a cathodic compartment (1) which comprises a cathode support frame (150) comprising a cathodic material (4) which acts as a cathode; a first fluid and gaseous $CO_2$ distribution frame (6) and a second fluid and gaseous $CO_2$ distribution frame (7); one or more cathodic gaskets (81, 82, 83 and 84), the cathodic gaskets being placed between the cathode support frame (150) and the distribution frames (6, 7), and as lateral ends of the cathodic compartment; wherein the cathode support frame (150) is disposed between the first and second distribution frames (6; 7);

b) an anodic compartment (2) which comprises an anode support frame (250) comprising an anodic material (5) which acts as an anode; a fluid distribution frame (8) arranged such that the fluid distribution frame (8) is on a portion of the anodic compartment closer to the membrane (3) than the anode support frame (250); and one or more anodic gaskets (85 and 86), the anodic gaskets being placed between the anode support frame (250) and the distribution frame (8), and as lateral ends of the anodic compartment; and c) an ion-exchange membrane, preferably a cation exchange membrane (3) disposed between the cathodic compartment (1) and the anodic compartment (2);

wherein i) the cathodic material (4) is a conductive porous electrode, such as a gas-diffusion electrode, with immobilized $CO_2$ electrocatalyst material ii) the first and second fluid and gaseous $CO_2$ distribution frames (6, 7) and cathodic gaskets (81, 82, 83 and 84) are arranged such that in use they allow introducing a catholyte and gaseous $CO_2$ separately into the cathodic compartment (1) through different inlet ports (11a, 11b) and they allow exiting the catholyte, liquid and gaseous products and/or unreacted $CO_2$ jointly through an outlet port (12);

iii) the fluid distribution frame (8), the anode support frame (250) and anodic gaskets (85 and 86) are arranged in such a way that in use they allow introducing an anolyte into the anodic compartment (2) through an inlet port (13), and they allow exiting the anolyte and oxidation products jointly through an outlet port (14);

iv) the anodic material (5) is a photocatalytic anodic material, and is located in a side facing the membrane (3) of an optical window (15) of the anode support frame (250); and is arranged such that in use is able to be in contact with the anolyte which is introduced into the anodic compartment via the inlet port (13) and, is able to be activated when the radiation used to irradiate the anodic compartment (2) reaches the optical window (15) by its opposite side which is not facing the membrane (3); and v) the anodic material (5) and the cathodic material (4) have a surface area ratio [(5):(4)] comprised from 1:1 to 1:0.02; preferably from 1:0.5 to 1:0.1

Another aspect of the present disclosure, relates to a method for producing a reduction product from carbon dioxide, the method comprising:
i) providing a filter-press photoelectrochemical cell as defined above;
ii) feeding the filter-press photoelectrochemical cell with an anolyte through an inlet port (13) into the anodic compartment (2), a catholyte through an inlet port (11a) into the cathodic compartment (1) and a gas containing $CO_2$ through a different inlet port (11b) into the cathodic compartment (1);
iii) applying to the cell an external electrical potential between cathode (4) and anode (5) with bias capacity ranging from 0 to 4 volts (V), preferably from 0 to 3 volts, more preferably from 0 to 2 volts;
iv) irradiating the photoanode with a radiation, thus radiation includes on the optical window (15) activating the photocatalytic anodic material (5) by its opposite side which is not facing the membrane (3);
v) collecting the products of the cathodic reaction from the cathodic compartment outlet (12) for identification and quantification.

The filter-press photoelectrochemical cell described herein comprises various essential technical features which differentiates it from the state of the art, namely adequate circulation of catholyte, $CO_2$ and $CO_2$ reduction product; use of a photocatalytic anodic material which is activated when the radiation used to irradiate the anodic compartment reaches the optical window by its opposite side which is not facing the membrane; use of a cathodic material which is a porous electrode with immobilized $CO_2$ electrocatalyst materials on highly conductive porous support; and the adequate selection of the photocatalytic anodic material to cathodic material surface area ratio. The combination of the above mentioned technical features allows obtaining $CO_2$ reduction products with a lower external energy supply, and maximizing $CO_2$ selective conversion to the desired product, according to the used electrocatalyst, under irradiation with a high faradaic efficiency.

BRIEF DESCRIPTION OF THE DRAWINGS

Non-limiting examples of the present disclosure will be described in the following, with reference to the appended drawings, in which.

DETAILED DESCRIPTION

Figure 1:
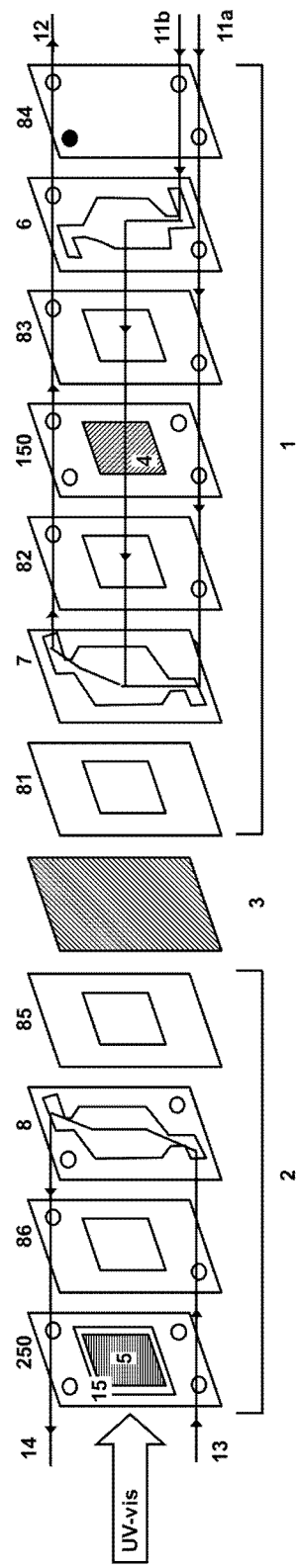
FIG. 1 shows schematically the filter-press photoelectrochemical cell of the present disclosure.

The present disclosure refers to a photoelectrochemical cell, of the filter-press type which operates with a conductive porous electrode (preferably a gas diffusion electrode) cathode; under continuous circulation of electrolytes, gaseous $CO_2$ and resulting products from the $CO_2$ reduction; with a photocatalytic anode which is activated by back illumination; and wherein anode and cathode electrodes have a surface area ratio comprised from 1:1 to 1:0.02; preferably from 1:0.5 to 1:0.1

Fluid distribution frames (6; 7; 8), cathode and anode support frames (150, 250) and cathodic and anodic gaskets (81, 82, 83, 84, 85 and 86) are hereinafter generally referred as individual cell units.

The filter-press photoelectrochemical cell of the present disclosure comprises different individual cell units which are assembled in series to form the cell. The individual cell units of the filter-press photoelectrochemical cell may be assembled to form the filter-press cell using a polymer adhesive or a single gasket between individual cell units. Preferably, gaskets are located between individual cell units.

Anodic gaskets (85 and 86) and cathodic gaskets (81, 82, 83 and 84) may be fabricated of a material selected from Viton, Ethylene Propylene Diene Monomer (EPDM) rubber, Chloroprene, Silicone, Nitrile, Butyle or other materials with similar characteristics; fluid distribution frames (6; 7; 8), cathode support frames (150) and anode support frame (250) may be fabricated of a material selected from polytetrafluoroethylene (PTFE), polypropylene (PP), Halar or other materials with similar characteristics. Additionally, cathode support frame (150) and anode support frame (250) may be fabricated or must partially contain a conductive material to enable them to act as current collectors.

Once assembled, the cell is closed and fitted with the adequate torque to assure mechanical robustness and fluidic watertight.

Both anolyte and catholyte may be recirculated through a dual-head peristaltic pump, into two separate containers. Gas products from $CO_2$ reduction exit the cell, while liquid products accumulate in the catholyte, (e.g. sodium formate). Gas products can be subsequently analyzed by conventional methods, such as gas chromatography or mass spectrometry, and liquid products by methods such as high performance liquid chromatography (HPLC).

In the present disclosure, HPLC method was performed with a Rezex ROA-Organic Acid H+(8%) 300×7.8 mm column, following an analytic method according to the literature based in an isocratic mode, with $H_2SO_4$ (between 1 and 4 mM) at 6 mL min$^{-1}$ mobile phase, and a UV detector at 210 or 254 nm.

Cathodic Compartment (1)

Figure 2:
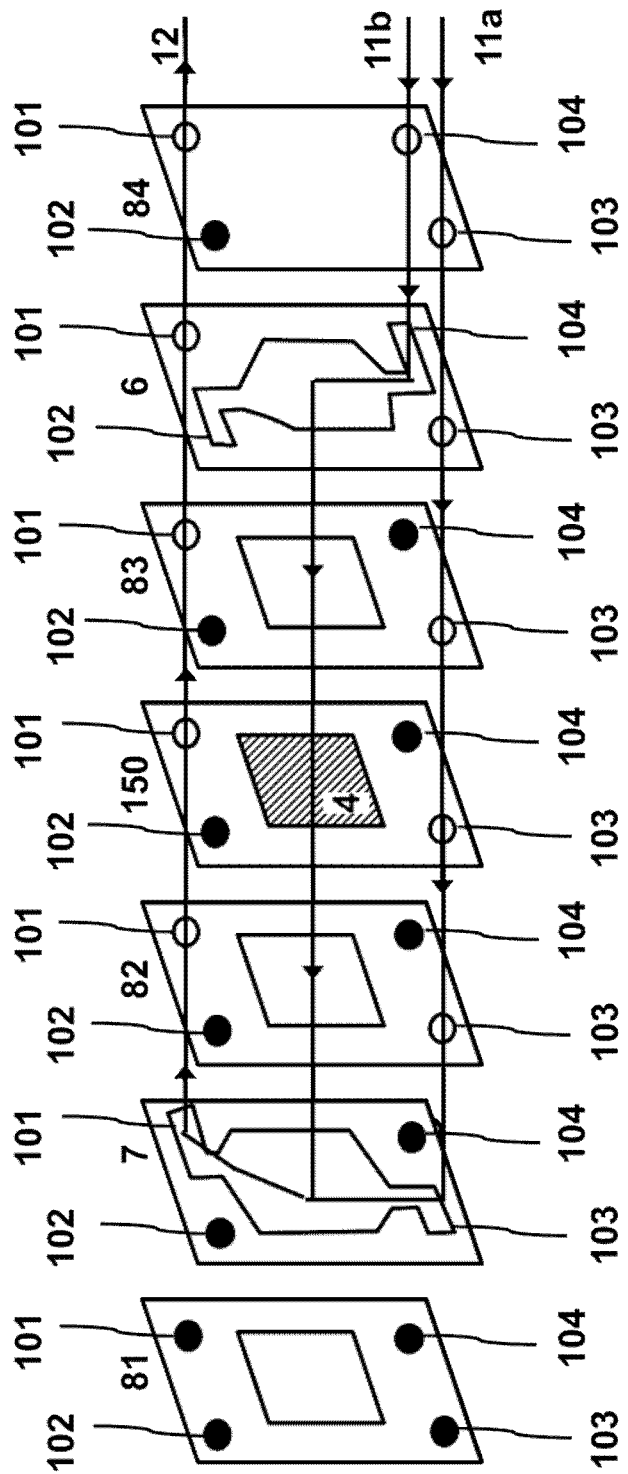
FIG. 2 shows schematically the cathodic compartment of the filter-press photoelectrochemical cell of the present disclosure. Empty circles represent open holes and black circles represent holes that are sealed or absent.

The cathodic compartment (1) is equipped with at least two fluid distributor frames (6 and 7); a cathode support frame (150) wherein it is located the cathodic material (4); and one or more gaskets (81, 82, 83 and 84), the cathodic gaskets being placed between the distributor frames (6, 7) and the cathode support frame (150), and as lateral ends of the cathodic compartment; and wherein the cathode support frame (150) is disposed between the first and second distribution frames (6; 7), as shown in FIG. 2.

All individual cell units of the cathodic compartment (1) may be equipped with holes (101, 102, 103 and 104) arranged between consecutive units, which align and mate with the corresponding holes in the adjacent unit, thus forming inlet (11*a*, 11*b*) and outlet ports (12) which are adapted to allow introduction of the catholyte and gaseous $CO_2$ into the catholyte compartment; and exit of catholyte, liquid and gaseous products and/or unreacted $CO_2$.

Figure 3A:
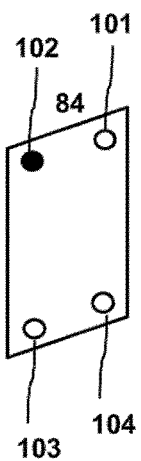
FIG. 3 shows schematically a cell unit of the cathodic compartment (gasket 84) equipped with four holes, in which one of them may be conveniently sealed (FIG. 3A) or absent (FIG. 3B).
Figure 3B:
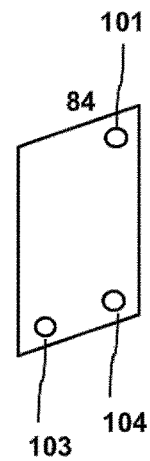
Figure 4A:
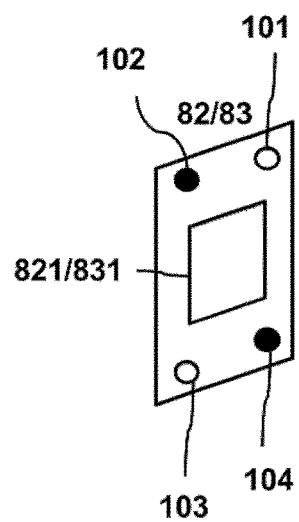
FIG. 4 shows schematically a cell unit of the cathodic compartment (gasket 83 or gasket 82) equipped with an opening and four holes, in which two of them may be conveniently sealed (FIG. 4A) or absent (FIG. 4B).
Figure 4B:
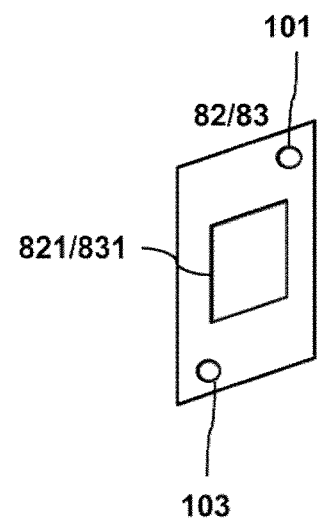
Figure 5A:
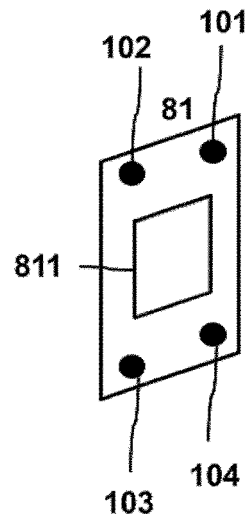
FIG. 5 shows schematically a cell unit of the cathodic compartment (gasket 81) equipped with an opening and four holes, in which the four of them may be conveniently sealed (FIG. 5A) or absent (FIG. 5B).
Figure 5B:
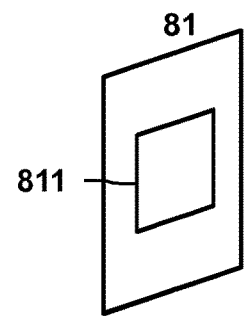

In accordance with an embodiment of the present disclosure, selected holes may be conveniently sealed, or alternatively selected holes are absent in the individual cell units of the cathodic compartment, so as to route catholyte through inlet port (11*a*), gaseous $CO_2$ through inlet port (11*b*), whereas exit of catholyte, liquid and gaseous products and/or unreacted $CO_2$ occurs jointly through the same outlet port (12). Thus, gasket 84 may be equipped with 4 holes, being one of them sealed or absent as shown in FIGS. 3A and 3B. Gaskets 83 and 82 may be equipped with 4 holes, being two of them sealed or absent as shown in FIGS. 4A and 4B. Gasket 81 may be equipped with 4 holes, being all of them sealed or absent as shown in FIGS. 5A and 5B.

Therefore, in accordance with the filter-press photoelectrochemical cell of the present disclosure, $CO_2$ is introduced in the cell in gaseous phase, instead of being dissolved in the catholyte (bubbling $CO_2$ up to saturation or using a gas/liquid mixer).

In case of electroreduction of solubilized $CO_2$, its concentration in aqueous solutions is relatively low (0.033M, 298K, 1 atm), limiting the available range of current densities of the electrochemical cell. Contrary, in accordance with the present disclosure, wherein $CO_2$ gas is directly feeded in the cell, it is possible to overcome the above mentioned limitation, being able to extend the working range at higher current densities. Additionally, the outlet gas port of the cell is closed, to enhance the $CO_2$ contact with the cathode, being more prone to the electrocatalytic reaction.

Cathodic gaskets 81, 82 and 83 may be equipped with openings (811, 821 and 831 respectively) as shown in FIGS. 4 and 5. Openings are arranged such that, when the photoelectrochemical cell is in use, cathodic gasket 83 allows direct contact of the gaseous $CO_2$, which reach distribution frame (6) via its corresponding inlet port (11*b*), with the conductive porous electrode material (4), cathodic gasket 82 allows direct contact of the gaseous $CO_2$, which passes through the gas diffusion material (4), with the catholyte which is introduced into the distribution frame (7) via its corresponding inlet port (11*a*); and cathodic gasket 81 allows direct contact of ions generated which pass through the ion exchange membrane with $CO_2$ and catholyte.

As mentioned above, the cathodic material (4) is a conductive porous electrode, such as gas-diffusion electrodes, with immobilized $CO_2$ electrocatalyst material onto a porous high conductive support material. In accordance with an embodiment of the present disclosure, the immobilized $CO_2$ electrocatalyst material of the cathodic material (4) is selected from:

a) a metal with a high overpotential to hydrogen evolution, low CO adsorption and high overpotential for $CO_2$ to $CO_2$ radical ion; such as Pb, Hg, In, Sn, Cd, Tl and Bi;

b) a metal with a medium overpotential to hydrogen evolution and low CO adsorption; such as Au, Ag, Zn, Pd and Ga;

c) a metal with a high CO adsorption and a medium overpotential to hydrogen evolution; such as Cu;

d) a metal with a relatively low overpotential to hydrogen evolution and a high CO adsorption, such as Ni, Fe, Pt, Ti;

e) an oxide of any of the metals of a), b), c) or d) type; and f) combinations thereof using different combinations techniques such as co-deposition technologies, electrochemical, physical or chemical based processes or using multicomponent particles.

In all the cases the electrocatalysts being deposited on a highly porous and conductor support.

In accordance with a preferred embodiment, the immobilized $CO_2$ electrocatalyst material of the cathodic material (4) is selected from the group consisting of Sn, Pb, Hg, Bi, In, Cd, Tl, Cu, CuO, $Cu_2O$, Au, Ag, Zn, Pd, Ga and combinations thereof, the materials deposited on a highly porous and conductor support. Particularly preferred are those electrocatalyst material of the cathodic material (4) selected from the group consisting of Pb, Hg, In, Sn, Cd, Tl, Bi and combinations hereof, the materials deposited on a highly porous and conductor support.

The reduction product of carbon dioxide thus obtained depends of the catalytic function of the used electrocatalyst as cathodic material. Thus, when the cathodic material is selected from the group a) the main reduction product obtained is formic acid (HCOOH) or formate salt ($HCOO^-$); when the cathodic material is selected from the group b) the main reduction product obtained is CO; when the cathodic material is selected from the group c) the main reduction product obtained is methane ($CH_4$) and ethylene ($C_2H_4$); when the cathodic material is selected from the group d) the main reduction product obtained is hydrogen.

Preferably, the support is a porous and high conductive support material such as carbon paper, carbon based nanofibers, metallic meshes and metal foams.

Catholyte

In accordance with an embodiment of the present disclosure, the catholyte comprises:

a) at least one polar protic solvent comprising at least one supporting electrolyte, and optionally b) a buffer;

the supporting electrolyte is a salt represented by the formula: $M_mX_n$ in which: M is selected from alkali (IA) and alkali earth metals (IIA) such as magnesium, calcium, lithium, potassium and sodium; X is selected from anions of weak or strong acids such as carbonates, bicarbonates, sulfates, hydroxides and halides. Preferably, the catholyte is selected from solutions of $NaHCO_3$, $KHCO_3$, $K_2CO_3$, $Na_2SO_4$, $H_2SO_4$, KCl and $KClO_4$.

Membrane (3)

Generally, the membrane is chemically resistant to the anolyte and catholyte.

At least one of the below mentioned membrane configurations may be employed in the filter-press photoelectrochemical cell:

(i) cation ion exchange membranes may be used in the filter-press photoelectrochemical cell, of which present disclosure include polytetrafluorethylene (PTFE) backbone with perfluorinated side chains of different lengths attached to the backbone through ether linkages and terminated by sulfonic acid (—SO3H) by the following structure,

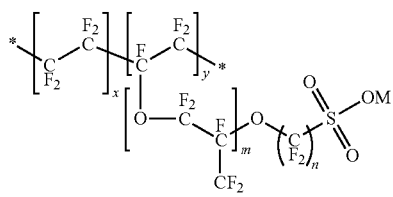

wherein, m is an integer 0-3 (preferably m=1, 2, or 3), n is an integer higher than 2 (preferably 2 or 3), x and y are each an integer of 1-100 (preferably an integer of 3-80), M is H or an alkali metal or alkaline earth metal such as Na, K, Li, Ca, Mg respectively;

(ii) anion exchange membranes, of which composed of a polymer backbone with tethered quaternized amines as functional groups to facilitate the movement of free OH— ions, may be used in present disclosure include; trimethyl ammonium (TMA), methyl-imidazolium, penta-methyl-guanidinium, and diazabicyclo[2,2,2]octane and derivatives;

(iii) other separators like nanofiltering membranes or ceramic based ion conductive membranes based on titanium oxides, zirconium oxides and yttrium oxides, and beta aluminium oxides, may also be employed.

Anodic Compartment (2)

Figure 6:
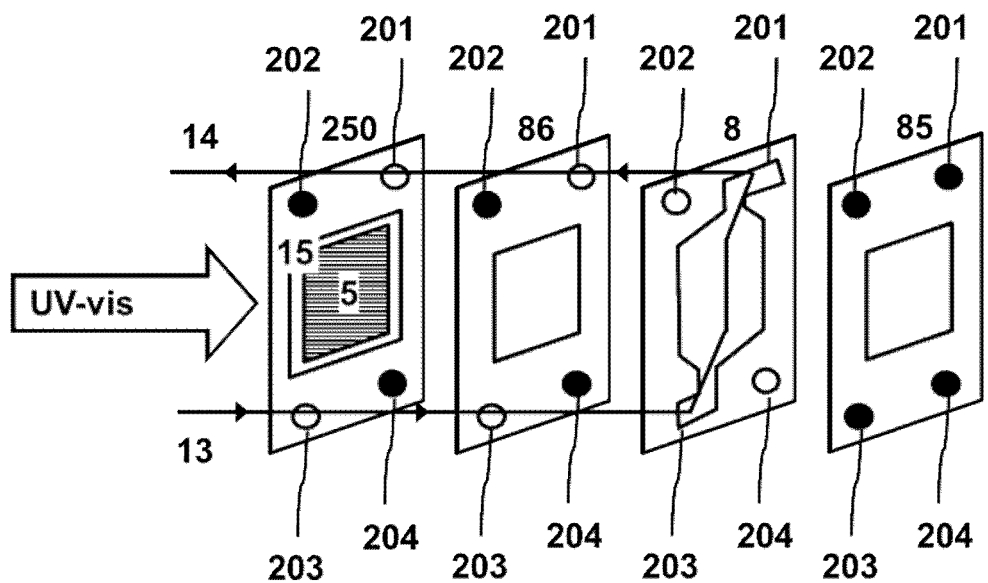
FIG. 6 shows schematically the anodic compartment of the filter-press photoelectrochemical cell of the present disclosure. Empty circles represent open holes and black circles represent holes that are sealed or absent.

The anodic compartment is equipped with at least one fluid distributor frame (8); an anode support frame (250) wherein it is located the photocatalytic anodic material (5); and one or more anodic gaskets (86) located between the distributor frame (8) and the anode support frame (250), and as lateral ends of the anodic compartment. Optionally, the anodic compartment (2) is equipped with at least one gasket (85) located between the fluid distributor frame (8) and the membrane (3) as shown in FIG. 6.

All individual cell units of the anodic compartment (2) may be equipped with holes (201, 202, 203 and 204) arranged between consecutive units, which align and mate with the corresponding holes in the adjacent unit, thus forming inlet (13) and outlet ports (14) which are adapted to allow introduction of the anolyte into the anolyte compartment; and exit of anolyte and oxidation products.

In accordance with an embodiment of the present disclosure, selected holes may be conveniently sealed or alternatively selected holes are absent in the individual cell units, so as to route anolyte through inlet port (13), whereas exit of anolyte and liquid and gaseous products occurs jointly through the same outlet port (14).

Figure 7A:
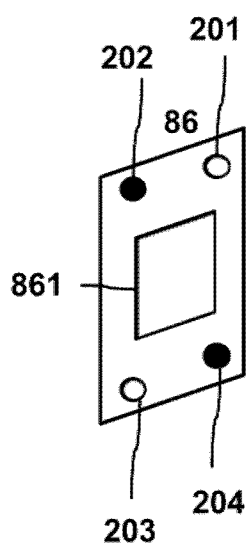
FIG. 7 shows schematically a cell unit of the anodic compartment (gasket 86) equipped with an opening and four holes, in which two of them may be conveniently sealed (FIG. 7A) or absent (FIG. 7B).
Figure 7B:
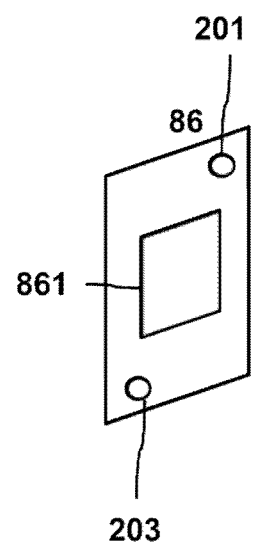
Figure 8A:
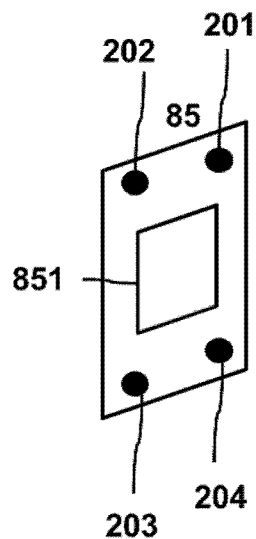
FIG. 8 shows schematically a cell unit of the anodic compartment (gasket 85) equipped with and opening and four holes, in which the four of them may be conveniently sealed (FIG. 5A) or absent (FIG. 5B).
Figure 8B:
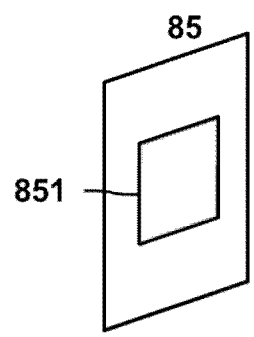
Figure 9:
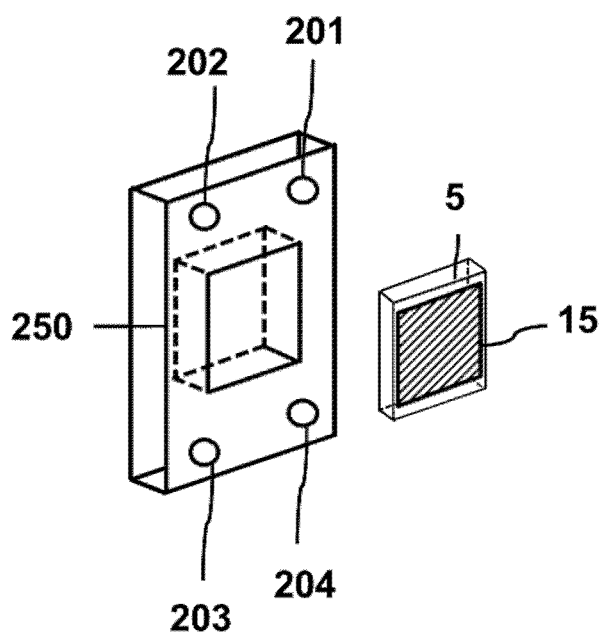
FIG. 9 shows schematically the anode support frame comprising an optical window and the photocatalytic anodic material.

Thus, gasket 86 may be equipped with 4 holes, being two of them sealed or absent as shown in FIGS. 7A and 7B. Gasket 85 may be equipped with 4 holes, being all of them sealed or absent as shown in FIGS. 8A and 8B.

Anodic gaskets (85 and 86) may be equipped with openings (851 and 861 respectively) as shown in FIGS. 7 and 8. Openings are arranged such that, when the photoelectrochemical cell is in use, anodic gasket 86 allows direct contact of the anolyte which is introduced into the distribution frame (8) via its corresponding inlet port (13) with the photocatalytic anodic material (5), anodic gasket 85 allows direct contact of cations generated with the cation exchange membrane.

The anode support frame (250) comprises an optical window (15) which may be a piece of glass or any other radiation transparent material, wherein it is supported the photocatalytic anodic material (5). The photocatalytic anodic material (5) is located in a side facing the membrane (3) of the optical window (15), thus the photocatalytic material is adapted to be in contact with the anolyte which it is introduced into the anodic compartment via an inlet port (13). Therefore, the photocatalytic anodic material (5) is illuminated by its back side.

Contrary to the approaches of front illumination (mesh or perforated electrodes to allow ion transport), in the photoelectrochemical cell of the present disclosure all the photocatalytic anodic material (5) may be activated. In other words, unlike previous proposed systems, in our system the design allows full illumination of the electrode. Moreover, it offers the option for using the energy photon below band gap of anode material for excite directly other part of the systems (cathode) if needed.

In case of front illumination, as in some of prior art designs, the photoanode is directly assembled or embedded in a proton transfer membrane (like in a PEM electrolyser). In this case, if the photoelectrode is not porous enough, the photocatalytic material prevents or blocks the ion transport through the membrane (in the case of PEM electrolyser, the membrane is a solid electrolyte), causing a high ohmic drop that can lead to a high cell potential required in the real device and offering a poor energy balance. In this scenario, some authors have proposed the use of titanium meshes (lately oxidized to obtain photoactive titanium oxide nanotubes) or perforated (track etched) current collectors to allow that the ions can move through the electrolyte and cross the membrane without significant difficulties in order to improve the hydrogen production.

In accordance with the filter-press photoelectrochemical cell of the present disclosure, the photoanode is not in direct contact with the membrane in order to facilitate the ion transport.

Anolyte

In accordance with an embodiment of the present disclosure, the anolyte comprises:
a) at least a polar protic solvent comprising at least on supporting electrolyte, and optionally
b) a buffer;
the supporting electrolyte is a salt of the formula $M_nY_n$ in which M is an alkali metal (IA) such as Lithium, Potassium, Sodium or an alkali earth metal (IIA) as Magnesium, Calcium, etc.; Y is either a hydroxide ion or a counter ion coming from mineral acids, such as halides, sulfates, nitrates, chlorates or phosphates. Preferably the anolyte is selected from solutions of NaOH, KOH, $H_2SO_4$, KCl, HCl, $H_3PO_4$, $NaHCO_3$, $K_2HPO_4$, $K_2SO_4$ and $Na_2SO_4$.

In accordance with an embodiment of the present disclosure, the photocatalytic anodic material (5) is selected from n-type semiconductor materials capable of oxidizing water (half reaction at the anode) without auto-oxidation problems, with a bandgap between 1.1 and 3.4 eV and having a maximum of the valence band edge energetically equal to or higher than 1.23 V vs RHE (Reference Hydrogen Electrode) to ensure that the photogenerated holes can be transferred to oxidize water.

Said semiconductor may be selected from semiconductor materials with different elements of the IV-IV, III-V, II-VI, I-VII groups and their ternary and quaternary combinations. The semiconductor may also be selected from single semiconductor (group IV), metal oxides, nitrides, oxynitrides and combinations thereof.

Preferably, the photoanode materials are selected among metal oxides or other semiconductors such as $TiO_2$, $WO_3$, $BiVO_4$, $Fe_2O_3$, $SrTiO_3$, GaAs, Si, amorphous Si, GaN, $MoS_2$, $WSe_2$, $MoSe_2$ and combinations thereof and considering some of them as absorbers coated for some other for avoiding anodic corrosion and enhancing their charge transfer capability. Likewise, in order to promote mechanisms of separation of the photogenerated charges and facilitate the transfer of loads from semiconductor to electrolyte, instead of n type semiconductor semiconductor structures type n-p or n-i-p can be employed.

Furthermore, the photoanode may include an oxygen evolution catalyst, such as Ir, CoFe, Co-Pi, Ni, Ni—Fe, or any other adequate oxygen evolution reactive to promote the reaction of oxidation of water.

In accordance with an embodiment of the present disclosure, turbulence promoters may be holded in gaskets adjacent to electrodes, thus enhancing mass transport.

It is contemplated that the filter-press photoelectrochemical cell according to the present disclosure may operate at higher pressures, such as pressure above atmospheric pressure which may increase current efficiency and allow operation of the cell at higher current densities.

Using the filter-press photoelectrochemical cell of the present disclosure, it is possible to electrolyze $CO_2$ at relatively low cell potentials, with high faradaic efficiencies and an improved consumed energy balance, thus requiring less external energy input.

A difference with prior art designs, is that the filter-press photoelectrochemical cell of the present disclosure maximizes $CO_2$ selective conversion to the desired product under irradiation, adjusting the area ratio between cathode and anode, so that the current density at the cathode is optimal for the conversion to a certain product, while maintaining the photoanode in a point of effective work in its photoresponse, and maintaining a cell voltage that favors the energy balance thanks to the contribution of the radiation to the photoanode. In this operation all the photocurrent produced in the photoanode is injected to the cathode and due to the selection of a value in the areas ratio may have different values of current densities at the cathode and, consequently, a selection of different cathode working points with different electrochemical characteristics.

Accordingly, it is possible to optimize simultaneously the working points of photoanode and cathode, maximizing the faradaic efficiency to the product of interest.

The simplified process for the reduction of $CO_2$ with the filter-press photoelectrochemical cell of the present disclosure is as follows:

when n-type semiconductor photoanode is irradiated with photons of energy equal to or greater than that of its band-gap, electrons are photo-excited from the valence band to the conduction band. On one hand, the photogenerated holes in the valence band of the semiconductor are swept by the electric field in the space charge for accumulation into the semiconductor surface. If, energetically, these holes have lower values than the oxidation of water values, then they can be transferred to contribute to the oxidation of water to form oxygen (oxidation half reaction), generating a photopotential associated with the photoanode/electrolyte system, which allows the oxidation of water at potential values for which the process would not occur in the absence of light. Furthermore, due to the electric field created in the space charge in the semiconductor-electrolyte interface and additionally applying to the cell an external electrical potential to promote charge separation (external bias), the electrons are collected and are extracted through the electrical contact, via the external electric circuit, to be led to the cathode, which when injected from a higher energy value can contribute to reducing $CO_2$ (reduction half reaction). As mentioned above, the main reaction product depends on the cathode material.

Accordingly, when radiation includes on the optical window (15) present in the anode support frame (250) by its side which is not facing the membrane (3), thus activating the photocatalytic anodic material (5) which is located in the side of the optical window (15) facing the membrane (3); activation of the photocatalytic anodic material (5) results in the generation of electron and hole pairs and at the same time $O_2$ evolves; (b) cations pass through the cation exchange membrane, while electrons are collected and reach the cathodic material (4) through an external wire, and (c)

$CO_2$ react in the presence of electrons on the distribution frame to give liquid and gaseous products.

The cathode may reduce the $CO_2$ into one or more compounds including:

oxocarbons (carbon monoxide) mostly by Zn, Au, Ag, Cd, In, Sn, Pb, Cu, Ni, Pd, Pt, Al, Ga, Fe, Cr, Mo, Ti, Nb;

carboxylic acids and their salts (formic acid, oxalic acid, glyoxylic acid, glycolic acid, oxalate, acetic acid, lactic acid, propanoic acid) mostly by Sn, Pb, In, Hg, Cu, Zn, Pt, Ti, Tl, Cd;

hydrocarbons (ethane, methane, ethylene, butane) mainly by Cu, Ni, Fe, Ru;

alcohols and derivatives (methanol, ethylene glycol, ethanol, propane, isopropanol, 1-propanol, 1,2-propylene glycol, butanol) mainly by Cu and Ru;

ketones (glyoxal, acetone)

aldehydes (formaldehyde, glycol aldehyde, acetaldehyde) mainly by Cu.

The filter-press photoelectrochemical cell of the present disclosure may further include a source of energy which is applied across the anode and cathode. The energy source may generate an electrical potential between the anode and cathode. The electrical potential may be a DC voltage. The energy source may be configured to implement a variable voltage source.

The anolyte outlet port (14) may conduct the oxidation product, depleted anolyte and depleted oxidizable anodic reactant. The catholyte output port (12) may contain the reduction product(s), depleted gaseous carbon dioxide and catholyte. The outputs may be designed to transport their contents to a region outside of the cell for storage, further processing or recycling. The system may be provided with separators to separate the component parts of the outputs, and recycle them back into the cell following appropriate processing whether by extraction, drying, ion separation, or further physical and/or chemical conversion. Thus, the filter-press photoelectrochemical cell of the present disclosure may operate in continuous mode.

The filter-press photoelectrochemical cell of the present disclosure may be configured to have a photocatalytic anodic material (5) to gas diffusion cathodic material (4) surface area ratio comprised from 1:1 to 1:0.02. Preferably from 1:0.5 to 1:0.1

When using surface area ratios different form 1:1, where cathode support frame (150) must define a smaller area than (250), the opening of cathodic gasket located between the cathode support frame and the fluid distribution frame (821) may be adjusted to the cathode area in order to avoid direct contact of the catholyte with the cathode support frame (150).

Throughout the description and claims the word "comprise" and variations of the word, are not intended to exclude other technical features, additives, components, or steps. Furthermore, the word "comprise" encompasses the case of "consisting of". Additional objects, advantages and features of the invention will become apparent to those skilled in the art upon examination of the description or may be learned by practice of the invention.

The following examples and drawings are provided by way of illustration, and they are not intended to be limiting of the present invention. Reference signs related to drawings and placed in parentheses in a claim, are solely for attempting to increase the intelligibility of the claim, and shall not be construed as limiting the scope of the claim. Furthermore, the present invention covers all possible combinations of particular and preferred embodiments described herein.

EXAMPLES

Experimental Procedure

The designed filter-press photoelectrochemical cell was used for the photoelectrochemical reduction of $CO_2$, containing a photoanode of 10 cm$^2$ and a cathode of variable size. In the electrochemical reduction experiments, in the absence of irradiation, a Dimensionally Stable Anode (DSA/$O_2$) plate was used as anode.

An ionic transport membrane divided the cell in anodic and cathodic compartments.

A leak-free Ag/AgCl 3.4 M KCl reference electrode was assembled in a polytetrafluoroethylene (PTFE) frame of the cell, placed very close to the cathode surface.

Anolyte and catholyte solutions were kept in two separated sealed tanks and pumped continuously to the cell by a dual peristaltic pump (Major Science, MU-D02), and the outlet of each compartment was transferred to the initial tank, for accumulation and analysis of the products. Catholyte was purified by pre-electrolysis at −2 V vs Pt for more than 12 h under nitrogen bubbling, and purged with argon before each experiment.

A mass flow controller (Bronkhorst) allows the adjustment of $CO_2$ flow rate entering the system, measured downstream by a volumetric digital flowmeter Agilent ADM 2000.

The experiments were carried out under potentiostatic conditions, applying a voltage between photoanode and cathode, using a potentiostat/galvanostat Biologic VMP3. A second potentiostat/galvanostat Biologic VMP3 was used to monitor the voltage of each electrode versus the Ag/AgCl reference electrode.

The photoelectrochemical cell was irradiated using a solar simulator Solar Light 16S equipped with a 300 W Xe-lamp and AM 1.5G filter. Power was measured using a thermopile detector.

For the quantification of the formic acid faradaic efficiencies, the electrolysis experiments were conducted up to the accumulation of a total charge of 200 coulombs per 50 mL of catholyte (in some experiments, 100 C/25 mL or 50 C/12.5 mL were considered to avoid aging of the catalyst).

The product in the liquid phase was analyzed, after acidification, by High Performance Liquid Chromatography system (HPLC, Perkin Elmer Flexar SQ300MS) equipped with a Rezex ROA-Organic Acid H$^+$ (8%) column (300×7.8 mm, Phenomenex), with an isocratic pump (2.5 mM H$_2$SO$_4$, 6 mL min$^{-1}$) and a UV Detector set at 210 nm.

Following examples were performed following the general experimental procedure as described above.

Example 1. Electroreduction of $CO_2$

To determine the working range of our photoelectrochemical system is necessary to characterize the electrochemical process under dark conditions, so that a similar cell without modification to accommodate the photoanode was used, working with a conventional anode and the cathode to be implemented in the photoelectrochemical cell. The working range of the photoelectrochemical process is one in which the electrochemical process under dark conditions does not occur.

Materials and Working Conditions:

Anode: DSA (dimensionally stable anode) commercial—Ta$_2$O$_5$—IrO$_2$ (area=10 cm$^2$)

Figure 10:
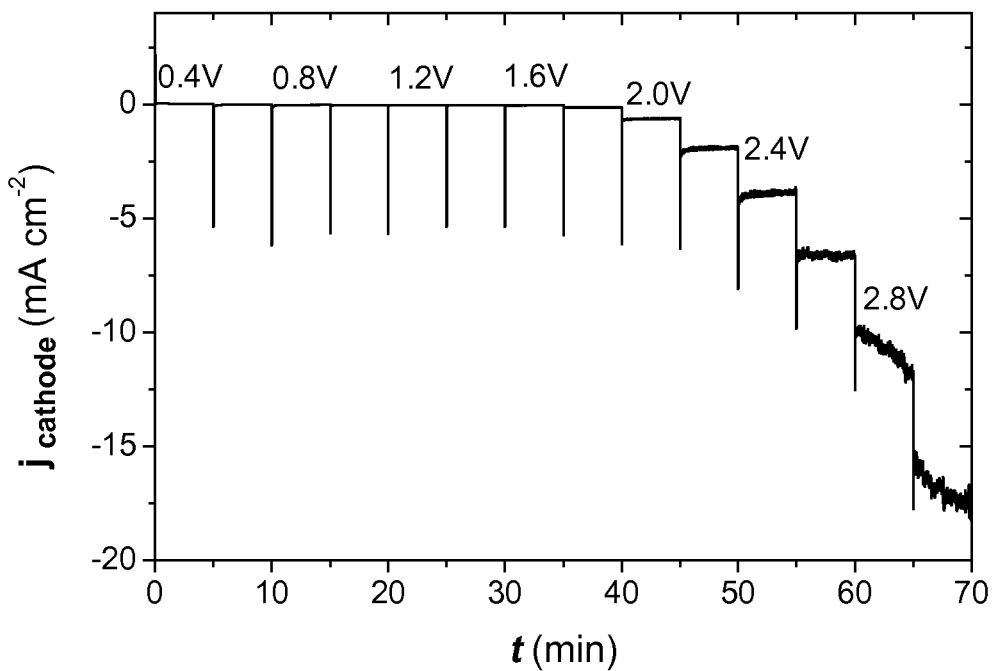
FIG. 10 shows the cathode current density ($j_{cathode}$) as a function of absolute value of applied voltage ($E_{cell}$) of example 1. Absolute value of applied voltage is stepped from 0.4 to 3 V at intervals of 0.2 V every 5 minutes.

Anolite: 0.5M NaOH or 0.5M KOH (10 mL min$^{-1}$)
Cathode: porous electrode, Sn supported on C-Toray (area=10 cm$^2$)
Catholite: 0.5M NaHCO$_3$ or 0.5M NaHCO$_3$ (10 mL/min)
Gas: pure CO$_2$ (10 mL min$^{-1}$).
Protonic exchange membrane: Nafion 117, In FIG. 10 is shown the cathode polarization as a function of absolute value of applied voltage. Cathode polarization is observed from 1.8 V. No cathodic reaction is obtained at $E_{cell} \leq 1.6$ V.

Figure 11:
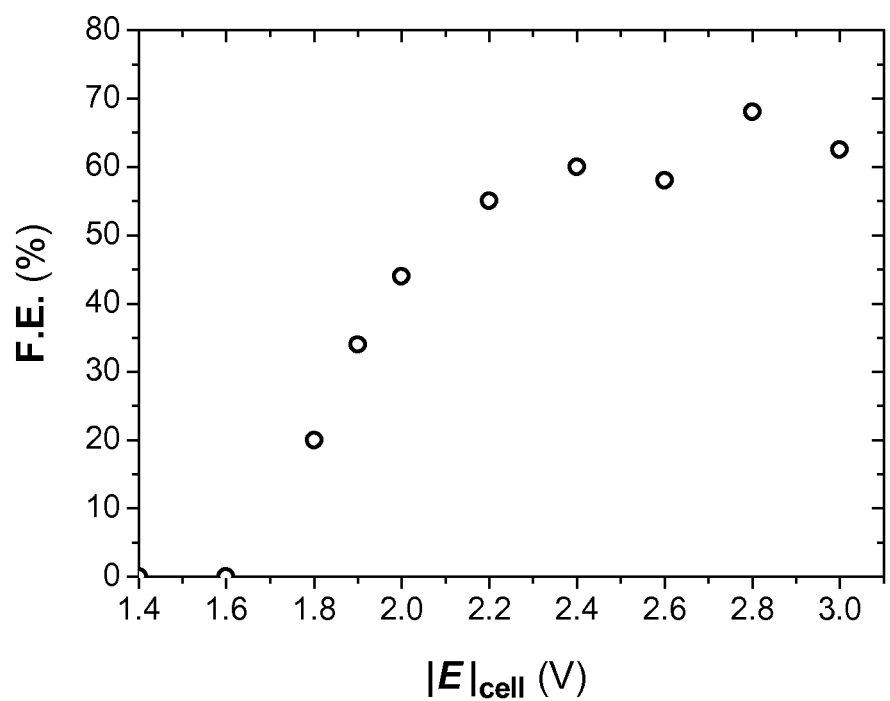
FIG. 11 shows the faradaic efficiency to formic acid (F.E.) as a function of absolute value of applied voltage ($|E|_{cell}$) of example 1.

FIG. 11 represents the faradaic efficiency to formic acid depending on the cell potential, showing that with a Sn cathode, faradaic efficiencies to formic acid can be achieved around to 60-75%, requiring the application of $|E|_{cell} \geq 2.4$ V.

The test conditions were individual electrolysis with polarization to two electrodes variable between 1.4 and 3 V (absolute value of cell voltage) measuring the individual potential of anode and cathode with a second potentiostate and a reference electrode.

Figure 12:
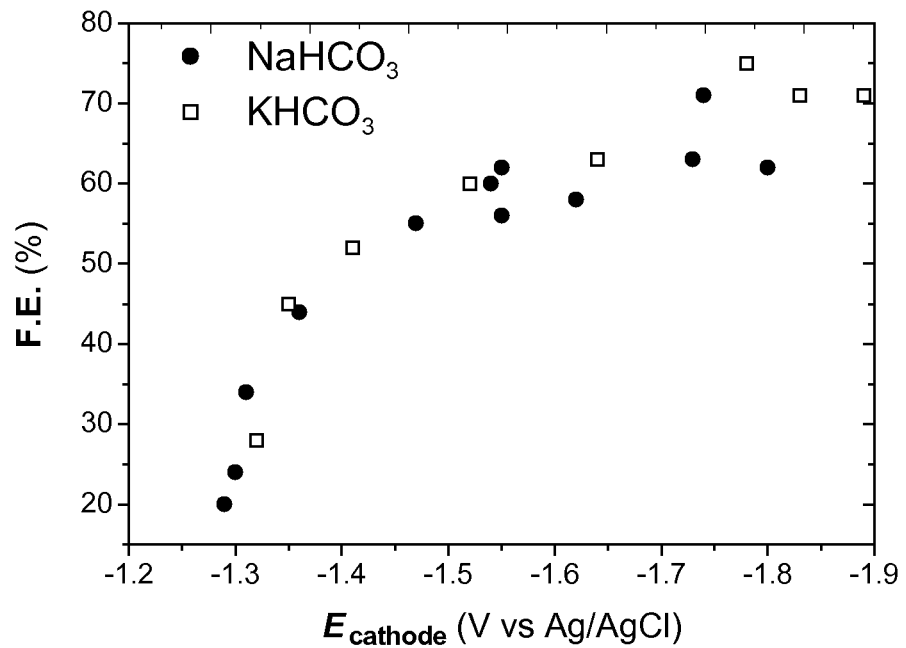
FIG. 12 shows the change of faradaic efficiency to formic acid (F.E.) in the process of example 1 as a function of individual cathode potential ($E_{cathode}$, which increases in absolute value with increasing cell voltage). Data obtained using two different catholytes: $NaHCO_3$ (filled circles) and $KHCO_3$ (empty squares).
Figure 13:
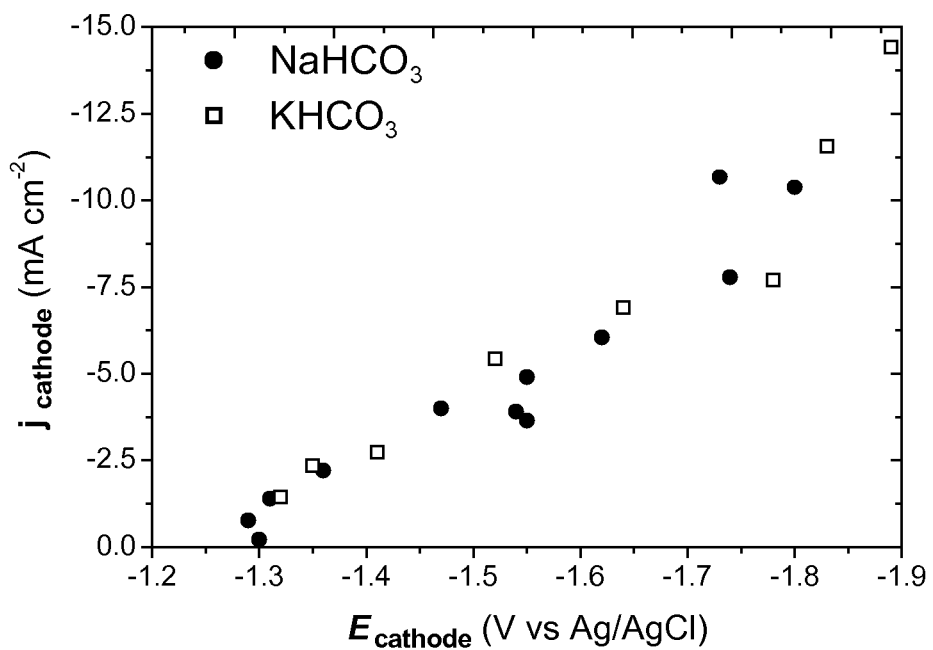
FIG. 13 shows the change of cathode current density ($j_{cathode}$) in the process of example 1 as a function of individual cathode potential ($E_{cathode}$, which increases in absolute value with increasing cell voltage). Data obtained using two different catholytes are shown: $NaHCO_3$ (filled circles) and $KHCO_3$ (empty squares).

FIGS. 12 and 13 show the change of faradaic efficiency of the process and current density as a function of individual cathode potential (which increases in absolute value with increasing cell voltage). In each assay the faradaic efficiency to formic acid was determined by HPLC in 50 mL of catholyte after 200 C electrolysis.

In FIGS. 12 and 13 it can be observed as for both electrolytes the faradaic efficiency to formic acid depends on the individual cathode potential, with no significant differences between the two electrolytes. It can be seen that for faradaic efficiencies above 40% are required cathode potentials of at least −1.35 V vs. Ag/AgCl. Additionally, it can be seen that to achieve these conversion values, electrolysis requires current densities higher than −2.5−−3 mA cm$^{-2}$.

In conclusion, there is no electrochemical reaction when $|E|_{cell} \leq 1.6$ V, cathode polarization increases from that value, when cell potential applied increases.

The working range selected for the photoelectrochemical cell of the present invention is located at an absolute value of cell potential lower than 1.6 V.

Example 2. Carbon Dioxide Photoelectroreduction

Figure 14:
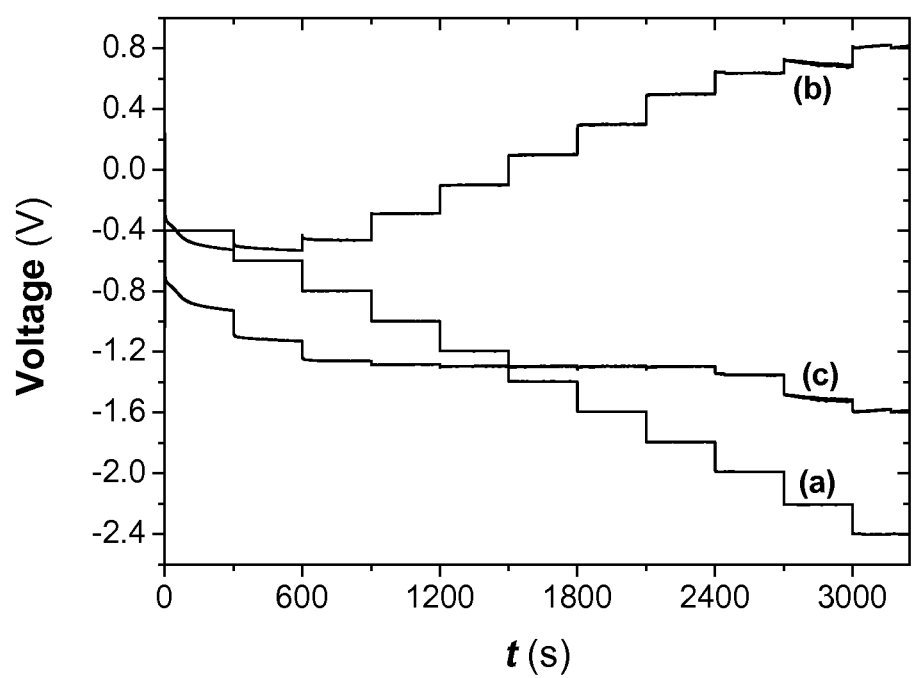
FIG. 14 shows the applied cell voltage (a), the individual anode potential (b), and individual cathode potential (c), of example 2 as a function of time. Applied voltage is stepped from 0.4 to 2.4 V at intervals of 0.2 V every 5 minutes.

Materials and Working Conditions:
Photoanode: TiO$_2$ nanorods deposited on glass substrate coated with FTO (area=10 cm$^2$)
Anolite: 0.5M NaOH (10 mL min$^{-1}$)
Cathode: porous electrode, Sn supported on C-Toray (area=10 cm$^2$)
Catholite: 0.5M NaHCO$_3$ (10 mL min$^{-1}$)
Gas: pure CO$_2$ (10 mL min$^{-1}$).
Protonic exchange membrane: Nafion 117,
Radiation flux: 100 mW cm$^{-2}$ FIG. 14 shows the applied cell voltage (a), the individual anode potential (b), and individual cathode potential (c), of example 2 as a function of time. Applied voltage is stepped from 0.4 to 2.4 V at intervals of 0.2 V every 5 minutes.

As can be observed, contrary to what occurs in the process under dark conditions, cathode polarizes at applied cell voltages ($|E|_{cell}$) lower than 1.8 V When the cell voltage increases, then photoanode polarization increases. Nevertheless, contrary to what it is observed in the process under dark conditions, wherein increasing the absolute value of cell voltage, then higher cathode polarization occurs, in the photoelectrochemical process, it is observed that between 1.2 V and 1.8 V, the cell voltage increase is invested in polarizing the photoanode remaining fixed the cathode polarization. Therefore, working with this photoelectrode and the cathode above 1.2 V ($|E|_{cell}$) will not improve the faradaic efficiency of the photoelectrochemical process. Above 1.8 V (outside the working range of the photoelectrochemical cell), the photoanode stops limiting the process and again the cathode polarization increases with increasing the cell voltage.

When the cell voltage applied was 1.2 V (in absolute value) it was obtained a faradaic efficiency to formic acid of 16%.

Example 3. Photoelectroreduction of CO$_2$ with Different Photoanode/Cathode Area Ratio The photoelectrochemical cell was adapted to accommodate different size cathodes (10, 5, 2, and 1 cm$^2$) maintaining fixed the photoanode size (10 cm$^2$).

Materials and Working Conditions:
Photoanode: TiO$_2$ nanorods deposited on glass substrate coated with FTO (area=10 cm$^2$)
Anolite: 0.5M NaOH (10 mL/min)
Cathode: porous electrode, Sn supported on C-Toray (area=10, 5, 2 and 1 cm$^2$)
Catholite: 0.5M NaHCO$_3$ (10 mL min$^{-1}$)
Gas: CO$_2$ puro (10 mL min$^{-1}$).
Protonic exchange membrane: Nafion 117,
Radiation flux: 100 mW cm$^{-2}$, 200 mW cm$^{-2}$, 500 mW cm$^{-2}$ and 1000 mW cm$^{-2}$.

Figure 15A:
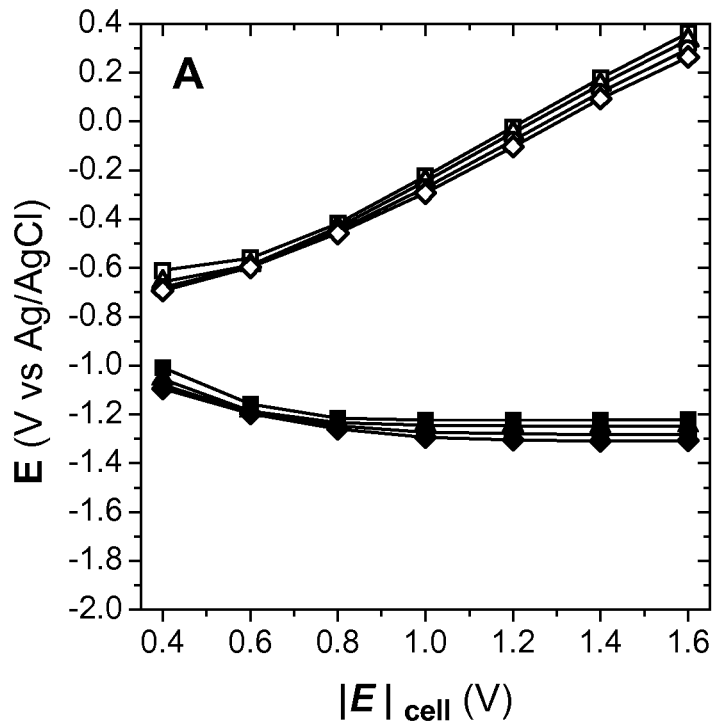
FIG. 15 shows the evolution of the individual cathode (filled symbols) and anode (empty symbols) potentials (FIG. 15A) and the evolution of the photogenerated current intensity (FIG. 15B) as a function of absolute value of applied voltage ($|E|_{cell}$) of example 2 with an anode-to-cathode area ratio of 1:1 at different radiation fluxes: 100 mW cm$^{-2}$ (squares), 200 mW cm$^{-2}$ (triangles), 500 mW cm$^{-2}$ (circles) and 1000 mW cm$^{-2}$ (diamonds).
Figure 15B:
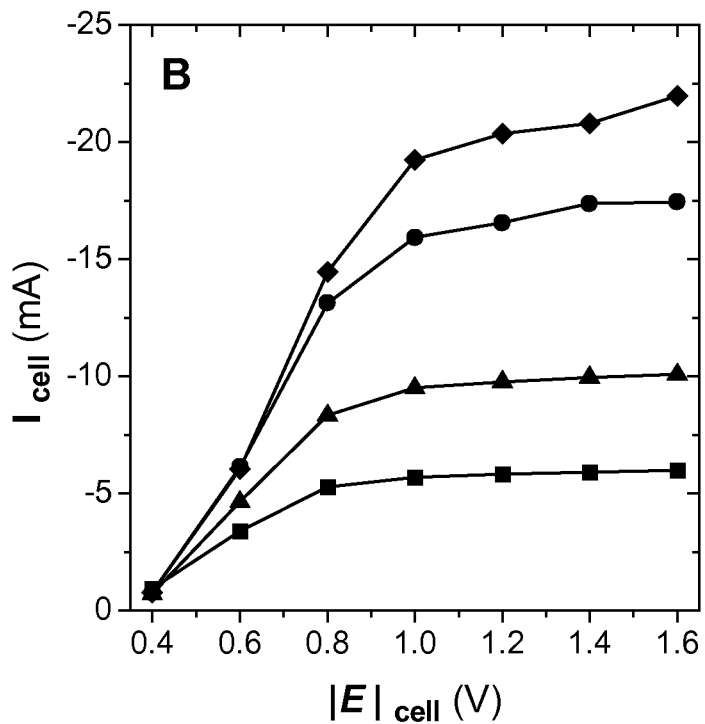

FIG. 15 shows the evolution of the individual cathode (filled symbols) and anode (empty symbols) potentials (FIG. 15A) and the evolution of the photogenerated current intensity (FIG. 15B) as a function of absolute value of applied voltage ($|E|_{cell}$) at different radiation fluxes: 100 mW cm$^{-2}$ (squares), 200 mW cm$^{-2}$ (triangles), 500 mW cm$^{-2}$ (circles) and 1000 mW cm$^{-2}$ (diamonds) for an anode-to-cathode area ratio of 1:1.

Figure 16A:
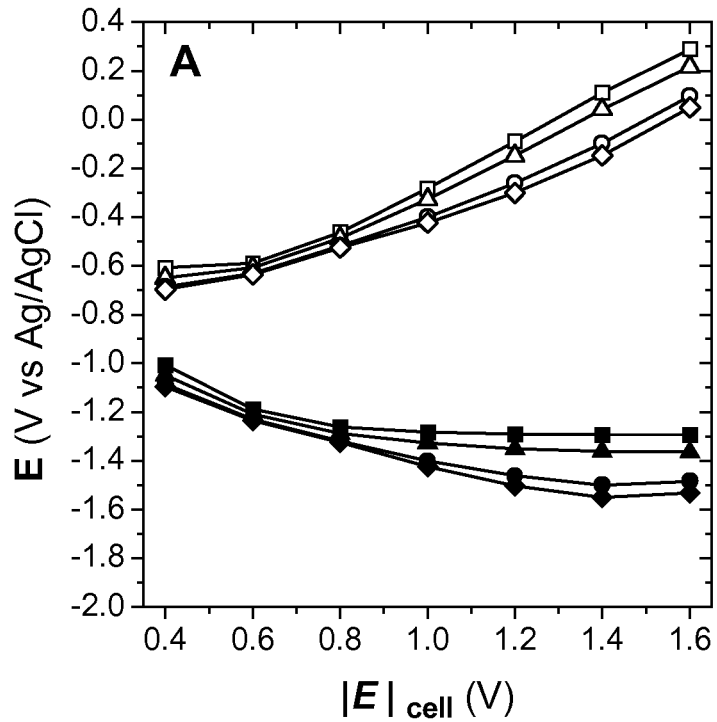
FIG. 16 shows the evolution of the individual cathode (filled symbols) and anode (empty symbols) potentials (FIG. 16A) and the evolution of the photogenerated current intensity (FIG. 16B) as a function of absolute value of applied voltage ($|E|_{cell}$) of example 2 with an anode-to-cathode area ratio of 1:0.5 at different radiation fluxes: 100 mW cm$^{-2}$ (squares), 200 mW cm$^{-2}$ (triangles), 500 mW cm$^{-2}$ (circles) and 1000 mW cm$^{-2}$ (diamonds).
Figure 16B:
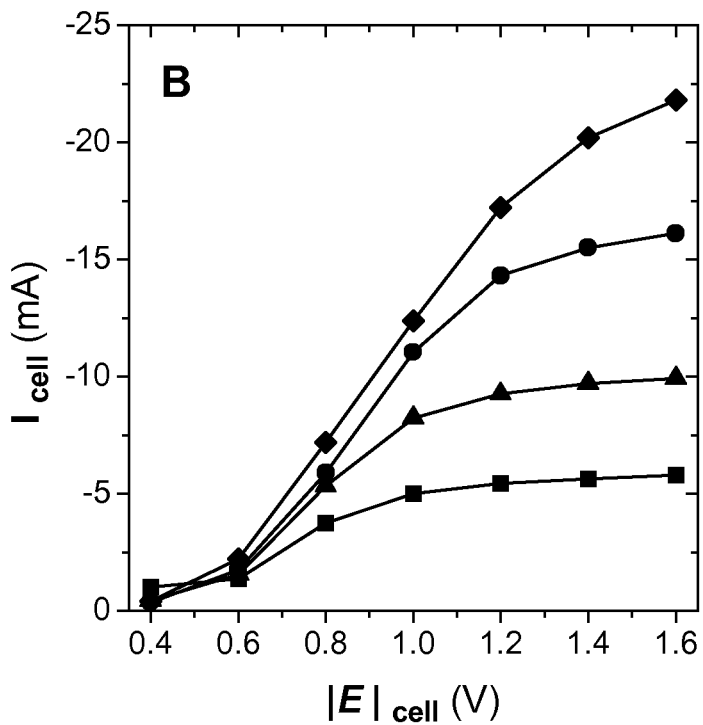

FIG. 16 shows the evolution of the individual cathode (filled symbols) and anode (empty symbols) potentials (FIG. 16A) and the evolution of the photogenerated current intensity (FIG. 16B) as a function of absolute value of applied voltage ($|E|_{cell}$) at different radiation fluxes: 100 mW cm$^{-2}$ (squares), 200 mW cm$^{-2}$ (triangles), 500 mW cm$^{-2}$ (circles) and 1000 mW cm$^{-2}$ (diamonds) for an anode-to-cathode area ratio of 1:0.5.

Figure 17A:
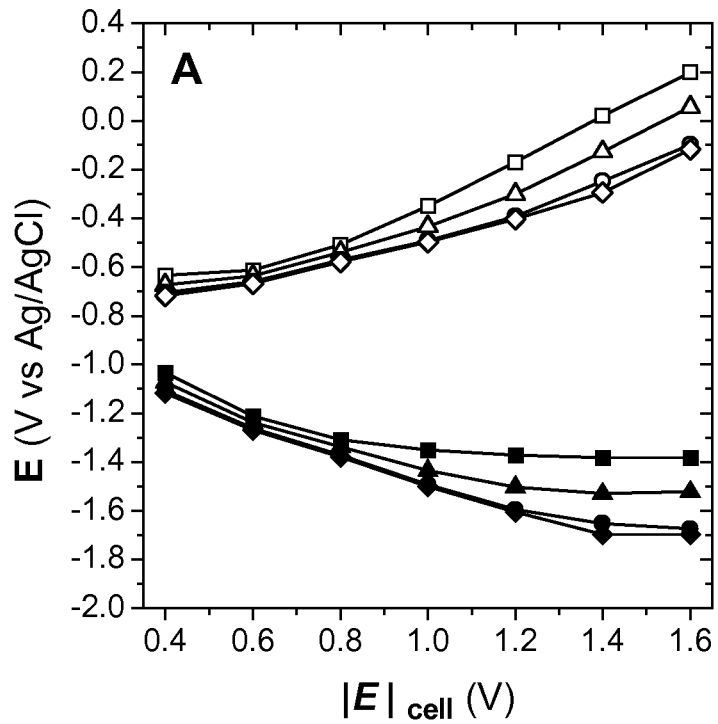
FIG. 17 shows the evolution of the individual cathode (filled symbols) and anode (empty symbols) potentials (FIG. 17A) and the evolution of the photogenerated current intensity (FIG. 17B) as a function of absolute value of applied voltage ($|E|_{cell}$) of example 2 with an anode-to-cathode area ratio of 1:0.2 at different radiation fluxes: 100 mW cm$^{-2}$ (squares), 200 mW cm$^{-2}$ (triangles), 500 mW cm$^{-2}$ (circles) and 1000 mW cm$^{-2}$ (diamonds).
Figure 17B:
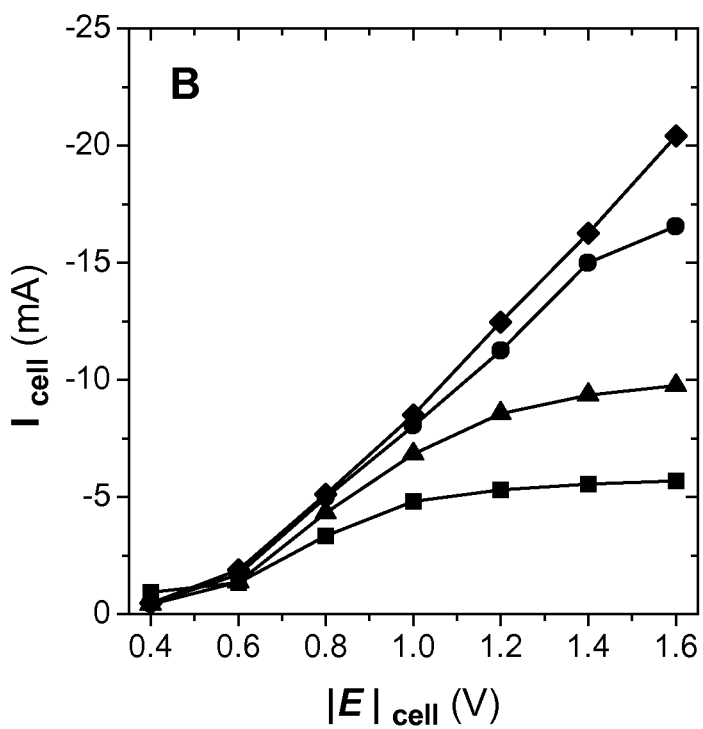

FIG. 17 shows the evolution of the individual cathode (filled symbols) and anode (empty symbols) potentials (FIG. 17A) and the evolution of the photogenerated current intensity (FIG. 17B) as a function of absolute value of applied voltage ($|E|_{cell}$) at different radiation fluxes: 100 mW cm$^{-2}$ (squares), 200 mW cm$^{-2}$ (triangles), 500 mW cm$^{-2}$ (circles) and 1000 mW cm$^{-2}$ (diamonds) for an anode-to-cathode area ratio of 1:0.2.

Figure 18A:
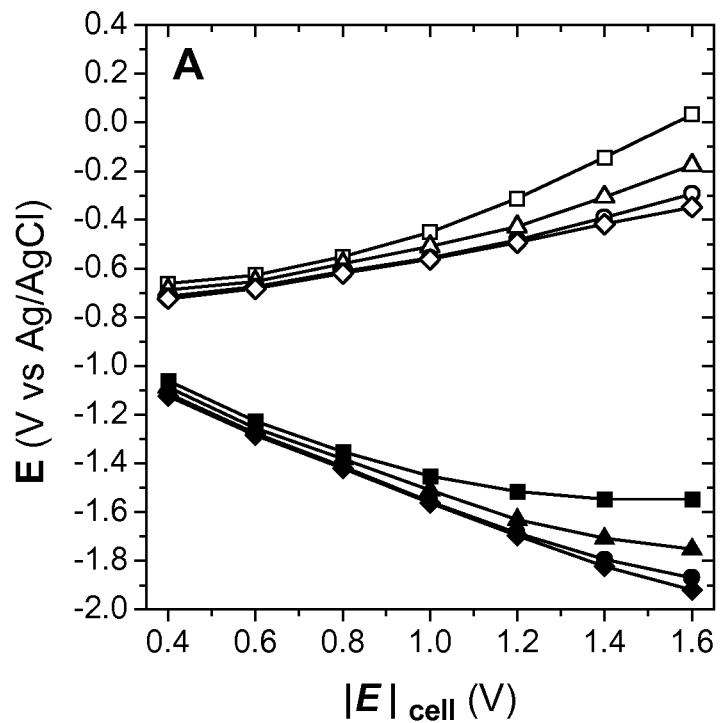
FIG. 18 shows the evolution of the individual cathode (filled symbols) and anode (empty symbols) potentials (FIG. 18A) and the evolution of the photogenerated current intensity (FIG. 18B) as a function of absolute value of applied voltage ($|E|_{cell}$) of example 2 with an anode-to-cathode area ratio of 1:0.1 at different radiation fluxes: 100 mW cm$^{-2}$ (squares), 200 mW cm$^{-2}$ (triangles), 500 mW cm$^{-2}$ (circles) and 1000 mW cm$^{-2}$ (diamonds).
Figure 18B:
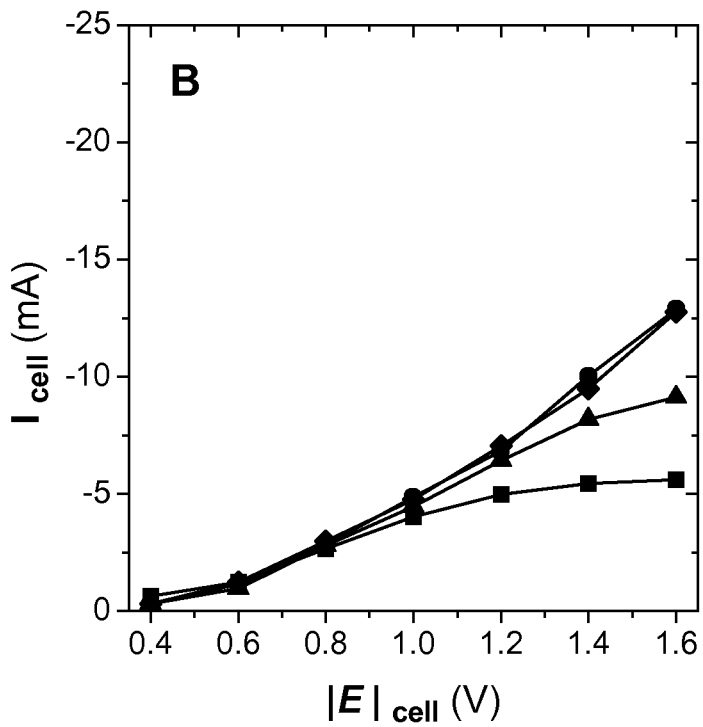

FIG. 18 shows the evolution of the individual cathode (filled symbols) and anode (empty symbols) potentials (FIG. 18A) and the evolution of the photogenerated current intensity (FIG. 18B) as a function of absolute value of applied voltage ($|E|_{cell}$) at different radiation fluxes: 100 mW cm$^{-2}$ (squares), 200 mW cm$^{-2}$ (triangles), 500 mW cm$^{-2}$ (circles) and 1000 mW cm$^{-2}$ (diamonds) for an anode-to-cathode area ratio of 1:0.1.

It is observed in all cases that increasing the radiation flux, it increases the photoanode polarization, the current intensity (photocurrent) and cathode polarization are also increased; and cathode polarization increases as we decrease the cathode area, thus higher cathode potentials (in absolute value) are obtained.

Considering the results of electrolysis, the correlation between the cathode polarization values and the cathode current intensity ranges required to obtained different faradaic efficiencies with the Sn cathode under dark conditions allow us to estimate the faradaic efficiency range resulting in each case. Thus, cathode potential in absolute value below 1.3 V results in faradaic efficiencies below 20%; cathode potential in absolute value between 1.3 and 1.35 V accompanied by current densities at the cathode between 1 and 2 mA cm$^{-2}$ result in faradaic efficiencies between 20 and 40%; cathode potential in absolute value between 1.35 and 1.4 V and current densities at the cathode below 2 mA cm$^{-2}$ result in faradaic efficiencies between 30 and 50%; cathode potential in absolute value between 1.4 and 1.7 V and current densities at the cathode above 2 mA cm$^{-2}$ result in faradaic efficiencies between 40 and 65%; finally, cathode potential in absolute value above 1.7 V with current densities at the cathode above 5-6 mA cm$^{-2}$ result in faradaic efficiencies between 60 and 75%.

Additionally, in some specific experiments, it was determined the exact quantitative data analyzing the catholyte by HPLC after photoelectrocatalytic process.

Following tables contain the experimental results:

TABLE 1

$E_{cell}$ = 0.4 V, photoanode area 10 cm$^2$

| Cathode area (cm$^2$) | Radiation (mW cm$^{-2}$) | $E_{anode}$ (V vs Ag/AgCl) | $E_{cathode}$ (V vs Ag/AgCl) | $j_{cathode}$ (mA cm$^{-2}$) | Faradic Efficiency (%) |
|---|---|---|---|---|---|
| 10 | 100 | −0.61 | −1.01 | −0.15 | 0 |
| 10 | 200 | −0.66 | −1.06 | −0.07 | 0 |
| 10 | 500 | −0.68 | −1.08 | −0.08 | 0 |
| 10 | 1000 | −0.69 | −1.09 | −0.08 | 0 |
| 5 | 100 | −0.61 | −1.01 | −0.19 | 0 |
| 5 | 200 | −0.65 | −1.05 | −0.09 | 0 |
| 5 | 500 | −0.69 | −1.08 | −0.07 | 0 |
| 5 | 1000 | −0.70 | −1.10 | −0.08 | 0 |
| 2 | 100 | −0.63 | −1.03 | −0.41 | 0 |
| 2 | 200 | −0.67 | −1.07 | −0.18 | 0 |
| 2 | 500 | −0.70 | −1.11 | −0.20 | 0 |
| 2 | 1000 | −0.72 | −1.12 | −0.21 | 0 |
| 1 | 100 | −0.66 | −1.06 | −0.51 | 0 |
| 1 | 200 | −0.69 | −1.09 | −0.24 | 0 |
| 1 | 500 | −0.71 | −1.11 | −0.24 | 0 |
| 1 | 1000 | −0.72 | −1.12 | −0.25 | 0 |

TABLE 2

$E_{cell}$ = −0.6 V, photoanode area 10 cm$^2$

| Cathode area (cm$^2$) | Radiation (mW cm$^{-2}$) | $E_{anode}$ (V vs Ag/AgCl) | $E_{cathode}$ (V vs Ag/AgCl) | $j_{cathode}$ (mA cm$^{-2}$) | Faradic Efficiency (%) |
|---|---|---|---|---|---|
| 10 | 100 | −0.56 | −1.16 | −0.26 | 0 |
| 10 | 200 | −0.59 | −1.19 | −0.31 | 0 |
| 10 | 500 | −0.59 | −1.19 | −0.41 | 0 |
| 10 | 1000 | −0.60 | −1.20 | −0.47 | 0 |
| 5 | 100 | −0.59 | −1.19 | −0.26 | 0 |
| 5 | 200 | −0.61 | −1.21 | −0.30 | 0 |
| 5 | 500 | −0.63 | −1.23 | −0.32 | 0 |
| 5 | 1000 | −0.64 | −1.24 | −0.43 | 0 |
| 2 | 100 | −0.61 | −1.21 | −0.58 | 0-20 |
| 2 | 200 | −0.64 | −1.24 | −0.59 | 0-20 |
| 2 | 500 | −0.66 | −1.26 | −0.74 | 0-20 |
| 2 | 1000 | −0.67 | −1.27 | −0.82 | 0-20 |
| 1 | 100 | −0.63 | −1.23 | −1.00 | 0-20 |
| 1 | 200 | −0.65 | −1.25 | −0.78 | 0-20 |
| 1 | 500 | −0.68 | −1.28 | −0.93 | 0-20 |
| 1 | 1000 | −0.68 | −1.28 | −1.01 | 0-20 |

TABLE 3

$E_{cell}$ = −0.8 V, photoanode area 10 cm$^2$

| Cathode area (cm$^2$) | Radiation (mW cm$^{-2}$) | $E_{anode}$ (V vs Ag/AgCl) | $E_{cathode}$ (V vs Ag/AgCl) | $j_{cathode}$ (mA cm$^{-2}$) | Faradic Efficiency (%) |
|---|---|---|---|---|---|
| 10 | 100 | −0.42 | −1.22 | −0.43 | 0 |
| 10 | 200 | −0.43 | −1.23 | −0.70 | 0-20 |
| 10 | 500 | −0.45 | −1.25 | −1.02 | 0-20 |
| 10 | 1000 | −0.46 | −1.26 | −1.17 | 0-20 |
| 5 | 100 | −0.46 | −1.26 | −0.69 | 0-20 |
| 5 | 200 | −0.49 | −1.29 | −1.04 | 0-20 |
| 5 | 500 | −0.52 | −1.32 | −1.09 | 20-40 |
| 5 | 1000 | −0.52 | −1.32 | −1.41 | 20-40 |
| 2 | 100 | −0.51 | −1.31 | −1.44 | 20-40 |
| 2 | 200 | −0.54 | −1.34 | −1.88 | 20-40 |
| 2 | 500 | −0.57 | −1.37 | −2.16 | 30-50 |
| 2 | 1000 | −0.58 | −1.38 | −2.21 | 30-50 |
| 1 | 100 | −0.55 | −1.35 | −2.15 | 30-50 |
| 1 | 200 | −0.58 | −1.38 | −2.27 | 30-50 |
| 1 | 500 | −0.61 | −1.41 | −2.28 | 40-65 |
| 1 | 1000 | −0.62 | −1.42 | −2.44 | 40-65 |

TABLE 4

$E_{cell}$ = −1.0 V, photoanode area 10 cm$^2$

| Cathode area (cm$^2$) | Radiation (mW cm$^{-2}$) | $E_{anode}$ (V vs Ag/AgCl) | $E_{cathode}$ (V vs Ag/AgCl) | $j_{cathode}$ (mA cm$^{-2}$) | Faradic Efficiency (%) |
|---|---|---|---|---|---|
| 10 | 100 | −0.22 | −1.22 | −0.50 | 0-20 |
| 10 | 200 | −0.24 | −1.24 | −0.84 | 0-20 |
| 10 | 500 | −0.27 | −1.27 | −1.41 | 20-40 |
| 10 | 1000 | −0.29 | −1.30 | −1.76 | 20-40 |
| 5 | 100 | −0.28 | −1.28 | −0.92 | 0-20 |
| 5 | 200 | −0.33 | −1.33 | −1.62 | 20-40 |
| 5 | 500 | −0.40 | −1.40 | −2.04 | 40-65 |
| 5 | 1000 | −0.42 | −1.42 | −2.43 | 40-65 |
| 2 | 100 | −0.35 | −1.35 | −2.09 | 30-50 |
| 2 | 200 | −0.43 | −1.43 | −2.95 | 40-65 |
| 2 | 500 | −0.49 | −1.49 | −3.48 | 40-65 |
| 2 | 1000 | −0.50 | −1.50 | −3.67 | 40-65 |
| 1 | 100 | −0.45 | −1.45 | −3.28 | 40-65 |
| 1 | 200 | −0.51 | −1.51 | −3.63 | 40-65 |
| 1 | 500 | −0.56 | −1.56 | −3.95 | 40-65 |
| 1 | 1000 | −0.56 | −1.56 | −3.88 | 40-65 |

TABLE 5

$E_{cell}$ = −1.2 V, photoanode area 10 cm$^2$

| Cathode area (cm$^2$) | Radiation (mW cm$^{-2}$) | $E_{anode}$ (V vs Ag/AgCl) | $E_{cathode}$ (V vs Ag/AgCl) | $j_{cathode}$ (mA cm$^{-2}$) | Faradic Efficiency (%) |
|---|---|---|---|---|---|
| 10 | 100 | −0.02 | −1.22 | −0.53 | 0-20 |
| 10 | 200 | −0.05 | −1.25 | −0.91 | 0-20 |
| 10 | 500 | −0.08 | −1.28 | −1.53 | 20-40 |
| 10 | 1000 | −0.10 | −1.30 | −1.99 | 20-40 |
| 5 | 100 | −0.09 | −1.29 | −1.00 | 20-40 |
| 5 | 200 | −0.15 | −1.35 | −1.81 | 20-40 |
| 5 | 500 | −0.26 | −1.46 | −2.64 | 40-65 |
| 5 | 1000 | −0.30 | −1.50 | −3.38 | 40-65 |
| 2 | 100 | −0.17 | −1.37 | −2.30 | 30-50 |
| 2 | 200 | −0.30 | −1.50 | −3.71 | 40-65 |
| 2 | 500 | −0.39 | −1.59 | −4.87 | 40-65 |
| 2 | 1000 | −0.40 | −1.61 | −5.40 | 40-65 |
| 1 | 100 | −0.31 | −1.51 | −4.05 | 40-65 |
| 1 | 200 | −0.43 | −1.63 | −5.22 | 40-65 |
| 1 | 500 | −0.48 | −1.69 | −5.56 | 40-65 |
| 1 | 1000 | −0.49 | −1.70 | −5.73 | 60-75 |

TABLE 6

$E_{cell} = -1.4$ V, photoanode area 10 cm$^2$

| Cathode area (cm$^2$) | Radiation (mW cm$^{-2}$) | $E_{anode}$ (V vs Ag/AgCl) | $E_{cathode}$ (V vs Ag/AgCl) | $j_{cathode}$ (mA cm$^{-2}$) | Faradic Efficiency (%) |
|---|---|---|---|---|---|
| 10 | 100 | 0.18 | −1.22 | −0.55 | 0-20 |
| 10 | 200 | 0.15 | −1.25 | −0.94 | 0-20 |
| 10 | 500 | 0.12 | −1.28 | −1.64 | 20-40 |
| 10 | 1000 | 0.09 | −1.31 | −2.10 | 30-50 |
| 5 | 100 | 0.11 | −1.29 | −1.04 | 20-40 |
| 5 | 200 | 0.04 | −1.36 | −1.90 | 20-40 |
| 5 | 500 | −0.10 | −1.50 | −2.86 | 40-65 |
| 5 | 1000 | −0.15 | −1.55 | −3.96 | 40-65 |
| 2 | 100 | 0.02 | −1.38 | −2.40 | 30-50 |
| 2 | 200 | −0.13 | −1.53 | −4.05 | 40-65 |
| 2 | 500 | −0.25 | −1.65 | −6.49 | 40-65 |
| 2 | 1000 | −0.29 | −1.70 | −7.04 | 60-75 |
| 1 | 100 | −0.14 | −1.55 | −4.43 | 40-65 |
| 1 | 200 | −0.31 | −1.71 | −6.65 | 60-75 |
| 1 | 500 | −0.39 | −1.79 | −8.15 | 60-75 |
| 1 | 1000 | −0.42 | −1.82 | −7.71 | 60-75 |

TABLE 7

$E_{cell} = -1.6$ V, photoanode area 10 cm$^2$

| Cathode area (cm$^2$) | Radiation (MW cm$^{-2}$) | $E_{anode}$ (V vs Ag/AgCl) | $E_{cathode}$ (V vs Ag/AgCl) | $j_{cathode}$ (mA cm$^{-2}$) | Faradic Efficiency (%) |
|---|---|---|---|---|---|
| 10 | 100 | 0.36 | −1.22 | −0.56 | 0-20 |
| 10 | 200 | 0.33 | −1.25 | −0.96 | 0-20 |
| 10 | 500 | 0.30 | −1.28 | −1.66 | 20-40 |
| 10 | 1000 | 0.26 | −1.31 | −2.14 | 30-50 |
| 5 | 100 | 0.29 | −1.29 | −1.07 | 20-40 |
| 5 | 200 | 0.22 | −1.36 | −1.95 | 20-40 |
| 5 | 500 | 0.10 | −1.48 | −2.97 | 40-65 |
| 5 | 1000 | 0.05 | −1.53 | −4.28 | 40-65 |
| 2 | 100 | 0.20 | −1.38 | −2.46 | 30-50 |
| 2 | 200 | 0.06 | −1.52 | −4.22 | 40-65 |
| 2 | 500 | −0.10 | −1.67 | −7.17 | 40-65 |
| 2 | 1000 | −0.12 | −1.70 | −8.84 | 60-75 |
| 1 | 100 | 0.03 | −1.55 | −4.56 | 40-65 |
| 1 | 200 | −0.18 | −1.75 | −7.41 | 60-75 |
| 1 | 500 | −0.29 | −1.87 | −10.47 | 60-75 |
| 1 | 1000 | −0.35 | −1.92 | −10.38 | 60-75 |

Table 8 shows the faradaic efficiency and energetic efficiency measured by HPLC

TABLE 8

$E_{cell} = -1.2$ V, photoanode area 10 cm$^2$

| Cathode area (cm$^2$) | Illumination (soles) | F-E. estimated (%) | F.E. measured (%) | Energetic efficiency (%) |
|---|---|---|---|---|
| 10 | 1 | 0-20 | 16 | 18 |
| 1 | 1 | 40-65 | 42 | 46 |
| 5 | 5 | 40-65 | 64 | 70 |

The invention claimed is:

1. A filter-press photoelectrochemical cell comprising:
   a) a cathodic compartment which comprises a cathode support frame comprising a cathodic material which acts as a cathode; a first fluid and gaseous CO$_2$ distribution frame and a second fluid and gaseous CO$_2$ distribution frame; cathodic gaskets, the cathodic gaskets being placed between the cathode support frame and the distribution frames, and as lateral ends of the cathodic compartment; wherein the cathode support frame is disposed between the first and second distribution frames;
   b) an anodic compartment which comprises an anode support frame comprising an anodic material which acts as an anode; a fluid distribution frame arranged such that the fluid distribution frame is on a portion of the anodic compartment closer to an ion-exchange membrane than the anode support frame; and anodic gaskets, the anodic gaskets being placed between the anode support frame and the distribution frame, and as lateral end of the anodic compartment; and
   c) the ion-exchange membrane disposed between the cathodic compartment and the anodic compartment; wherein
      i) the cathodic material is a conductive porous electrode with immobilized CO$_2$ electrocatalyst material;
      ii) the first and second fluid and gaseous CO$_2$ distribution frames and cathodic gaskets are arranged such that in use they allow introducing a catholyte and gaseous CO$_2$ separately into the cathodic compartment through different inlet ports and they allow exiting the catholyte, liquid and gaseous products and/or unreacted CO$_2$ jointly through an outlet port;
      iii) the fluid distribution frame, the anode support frame and anodic gaskets are arranged in such a way that in use they allow introducing an anolyte into the anodic compartment through an inlet port, and they allow exiting the anolyte and oxidation products jointly through an outlet port;
      iv) the anodic material, is a photocatalytic anodic material, and is located on a side facing the membrane of an optical window of the anode support frame; and is arranged such that in use is able to be in contact with the anolyte which is introduced into the anodic compartment via the inlet port and, is able to be activated when a radiation used to irradiate the anodic compartment reaches the optical window by its opposite side which is not facing the membrane; and
      v) the photocatalytic anodic material and the gas diffusion cathodic material have a surface area ratio comprised from 1:1 to 1:0.1.

2. The filter-press photoelectrochemical cell according to claim 1, wherein the immobilized CO$_2$ electrocatalyst material of the cathodic material is selected from the group consisting of
   a) a metal with a high overpotential to hydrogen evolution, low CO adsorption and high overpotential for CO$_2$ to CO$_2$ radical ion, selected from the group consisting of Pb, Hg, In, Sn, Cd, Tl and Bi;
   b) a metal with a medium overpotential to hydrogen evolution and low CO adsorption, selected from the group consisting of Au, Ag, Zn, Pd and Ga;
   c) a metal with a high CO adsorption and a medium overpotential to hydrogen evolution, selected from the group consisting of Cu;
   d) a metal with a relatively low overpotential to hydrogen evolution and a high CO adsorption, selected from the group consisting of Ni, Fe, Pt, Ti;
   e) an oxide of any of the metals of a), b), c) or d) type; and
   f) combinations thereof;
the material being deposited on a highly porous and conductor support.

3. The filter-press photoelectrochemical cell according to claim 2, wherein the highly porous and conductor support is selected from the group consisting of carbon paper, carbon based nanofibers, metallic meshes, and metal foams.

4. The filter-press photoelectrochemical cell according to claim 1, wherein the immobilized $CO_2$ electrocatalyst material of the cathodic material is selected from the group consisting of Sn, Pb, Hg, Bi, In, Cd, Tl, Cu, CuO, $Cu_2O$, Au, Ag, Zn, Pd, Ga and combinations thereof, the material being deposited on a highly porous and conductor support.

5. The filter-press photoelectrochemical cell according to claim 1, wherein the immobilized $CO_2$ electrocatalyst material of the cathodic material is selected from the group consisting of Pb, Hg, In, Sn, Cd, Tl, Bi and combinations thereof, the material being deposited on a highly porous and conductor support.

6. The filter-press photoelectrochemical cell according to claim 1, wherein the photocatalytic anodic material is selected from semiconductor materials with a bandgap between 1.1 and 3.4 eV and valence band edge equal to or higher than 1.23 V vs RHE.

7. The filter-press photoelectrochemical cell according to claim 6, wherein the photocatalytic anodic material is selected from the group consisting of $TiO_2$, $WO_3$, $BiVO_4$, $Fe_2O_3$, $SrTiO_3$, Si, amorphous Si, GaAs, GaN, $MoS_2$, $WSe_2$, $MoSe_2$ and combinations thereof.

8. The filter-press photoelectrochemical cell according to claim 1, wherein the anolyte comprises:
 a) at least one polar protic solvent comprising at least one supporting electrolyte, and
 b) optionally a buffer solution;
the supporting electrolyte is a salt of the formula $M_mY_n$ in which M is selected from the group consisting of lithium, potassium, sodium, magnesium, calcium, and strontium; and Y is either a hydroxide ion or a counter ion coming from mineral acids selected from the group consisting of halides, sulfates, nitrates, chlorates and phosphates.

9. The filter-press photoelectrochemical cell according to claim 8, wherein the salt included as a supporting electrolyte is selected from the group consisting of NaOH, KOH, $H_2SO_4$, KCl, HCl, $H_3PO_4$, $NaHCO_3$, $K_2HPO_4$, $K_2SO_4$, and $Na_2SO_4$.

10. The filter-press photoelectrochemical cell according to claim 1, wherein the catholyte comprises:
 a) at least one polar protic solvent comprising at least one supporting electrolyte, and
 b) optionally a buffer solution;
the supporting electrolyte is a salt of the formula $M_mX_n$ in which: M is selected from the group consisting of magnesium, calcium, lithium, potassium and sodium; and X is selected from anions of weak or strong acids selected from the group consisting of carbonates, bicarbonates, sulfates, chlorates, hydroxides and halides.

11. The filter-press photoelectrochemical cell according to claim 10, wherein the salt included as a supporting electrolyte is selected from the group consisting of $NaHCO_3$, $KHCO_3$, $K_2CO_3$, $Na_2SO_4$, $K_2SO_4$, KCl, and $KClO_4$.

12. The filter-press photoelectrochemical cell according to claim 1, wherein the ion-exchange membrane is an ion-exchange membrane that permits selected ions to cross the membrane to balance the process stoichiometry.

13. The filter-press photoelectrochemical cell according to claim 1, wherein the ion-exchange membrane is a cation exchange membrane.

14. A method for reducing carbon dioxide comprising the steps of:
 i) providing an filter-press photoelectrochemical cell as defined in claim 1;
 ii) feeding the filter-press photoelectrochemical cell with an anolyte through an inlet port into the anodic compartment, a catholyte through an inlet port into the cathodic compartment and a gas containing $CO_2$ through a different inlet port into the cathodic compartment;
 iii) applying to the cell an external electrical potential between the cathode and the anode with bias capacity ranging from 0 to 4 volts;
 iv) irradiating the photoanode with a radiation, thus radiation includes on the optical window activating the photocatalytic anodic material by its opposite side which is not facing the membrane; and
 v) collecting the products of the cathodic reaction from the cathodic compartment outlet port for identification and quantification.

15. The method according to claim 14 wherein the irradiating step is carried out using solar radiation or an artificial UV-Vis radiation source.

\* \* \* \* \*